United States Patent
Jin et al.

(10) Patent No.: US 9,430,335 B2
(45) Date of Patent: Aug. 30, 2016

(54) OPTIMIZING THE NUMBER AND TYPE OF DATABASE BACKUPS TO ACHIEVE A GIVEN RECOVERY TIME OBJECTIVE (RTO)

(71) Applicant: International Business Machines Corporation, Armonk, NY (US)

(72) Inventors: Gary N. Jin, Portland, OR (US); Steven R. Pearson, Portland, OR (US); Prasadarao Akulavenkatavara, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 14/030,168

(22) Filed: Sep. 18, 2013

(65) Prior Publication Data

US 2015/0081639 A1    Mar. 19, 2015

(51) Int. Cl.
*G06F 11/14* (2006.01)

(52) U.S. Cl.
CPC ........ *G06F 11/1461* (2013.01); *G06F 11/1451* (2013.01); *G06F 2201/80* (2013.01)

(58) Field of Classification Search
None
See application file for complete search history.

(56) References Cited

U.S. PATENT DOCUMENTS

| | | | |
|---|---|---|---|
| 7,246,254 B2 | 7/2007 | Alur et al. | |
| 7,457,830 B1 | 11/2008 | Coulter et al. | |
| 8,260,750 B1 | 9/2012 | Gugick et al. | |
| 8,261,122 B1* | 9/2012 | Kappel | G06F 11/1402 |
| | | | 714/2 |
| 2004/0078628 A1* | 4/2004 | Akamatu | G06F 9/4881 |
| | | | 714/6.1 |
| 2006/0074993 A1* | 4/2006 | Pulamarasetti | G06F 11/1458 |
| 2006/0255940 A1 | 11/2006 | White et al. | |
| 2008/0154979 A1 | 6/2008 | Saitoh et al. | |
| 2009/0313626 A1* | 12/2009 | Dawson | G06Q 10/06 |
| | | | 718/100 |
| 2012/0089572 A1 | 4/2012 | Raichstein et al. | |
| 2012/0137282 A1 | 5/2012 | Illowsky et al. | |
| 2012/0203742 A1* | 8/2012 | Goodman | G06F 11/1469 |
| | | | 707/646 |
| 2012/0303998 A1 | 11/2012 | Sun | |
| 2013/0054536 A1* | 2/2013 | Sengupta | G06F 17/30289 |
| | | | 707/654 |
| 2015/0081643 A1 | 3/2015 | Jin et al. | |
| 2015/0081646 A1 | 3/2015 | Jin et al. | |

OTHER PUBLICATIONS

Ruiz, IL et al.; "New models for the clustering of large databases through a hierarchical paradigm"; Proceedings 5th International Conference on Intelligent Systems Design and Applications, pp. 2-7, IEEE Computing Society; 2005.

(Continued)

*Primary Examiner* — Robert Beausoliel, Jr.
*Assistant Examiner* — Pedro J Santos
(74) *Attorney, Agent, or Firm* — Teddi E. Maranzano; Mohammed Kashef

(57) ABSTRACT

A method of optimizing the number and type of database backups to achieve a given RTO is provided and may include receiving a RTO and receiving a heuristic for determining an amount of unencumbered processing time. A type of next backup, (i.e., a next backup), is determined wherein the type of next backup is an incremental backup when the sum of the heuristic, and the times to: restore the latest full backup, restore zero or more incremental backups, complete a current incremental backup, and perform a full backup is less than the received RTO, else the type of the next backup is a full backup. A time to schedule the next backup is scheduled based on the received RTO being a total of an amount of time to: complete the type of next backup; rollforward zero or more transaction log records; and to restore at least one backup.

20 Claims, 5 Drawing Sheets

(56) References Cited

OTHER PUBLICATIONS

Nakamura, et al., "A Flexible Replication Mechanism with Extended Database Connection Layers", Fifth IEEE International Symposium on Network Computing and Applications (NCA '06), 2006 IEEE.

Nakamura, et al., "Optimal backup interval of database by incremental backup method", Proc of the 2009 IEEE Intl Conf on Industrial Engineering and Engineering Management (IEEM 2009), pp. 218-22, DOI: 10.1109/IEEM.2009.5373382.

Qian, et al., "Optimal Backup Policies for a Database System with Incremental Backup", Electronics and Communications in Japan, 2002, pp. 1-9, vol. 85, No. 4, 2001 Scripta Technica DOI 10.1002/ecjc.1081.

Schulman, "Disaster Recovery Issues and Solutions," Hitachi Data Systems White Paper, Sep. 2004, p. 1-19.

\* cited by examiner

OPTIMIZING THE NUMBER AND TYPE OF DATABASE BACKUPS TO ACHIEVE A GIVEN RECOVERY TIME OBJECTIVE (RTO)

FIELD

The present disclosure relates generally to the field of computer systems, and more particularly, to database backup and recovery operations.

BACKGROUND

A Database Management System (DBMS) stores large volumes of data to support diverse workloads and heterogeneous applications. The DBMS is critical to business transaction processing and decision making, and may incorporate strategies that promote keeping the data highly available. However, a DBMS may unexpectedly fail for various reasons, including defects in a hardware or software component within a computer system.

A DBMS may perform many complex operations, consisting of multiple steps, such as for example, creating a new table. The amount of work required to complete an operation varies, and may depend upon such factors as the algorithms and architecture chosen by the DBMS vendor to implement product features. Similarly, the time required to recover an operation (i.e., replay from the log) varies by the type of operation. For example, a table reorganization operation is much more complex, i.e., takes more steps to complete, than an operation to insert a row of data in a table, and consequently will take much longer to recover. A recovery cost is not a simple linear function that is based solely on the amount of data and a number of operations, but is also dependent on the type of workloads and the complexity of the operations that are executed. The nonlinear nature of database operations makes it challenging for a Database Administrator (DBA) to predict the time it will take to perform a future recovery operation. Consequently, the DBA may often rely on a combination of intuition, trial and error, and experience when designing a recovery plan to meet the business enterprise's Recovery Time Objective (RTO), which may be referred to as a maximum length of time that a DBMS may remain unavailable following a service disruption.

One solution that the DBA may often choose is to back up the DBMS more frequently than required, rather than risk a situation where the business may miss the RTO goal or be unable to meet a Service Level Agreement with an end user community. This problem becomes more pronounced in a cloud environment where the volume of data tends to be high, the types of workloads accessing the data tend to be much more diverse, and there tends to be fewer DBAs available to manage the installation.

BRIEF SUMMARY

Among other things, a method and system of optimizing the number and type of database backups to achieve a given RTO is provided. According to an embodiment of the invention, a method of optimizing the number and type of database backups to achieve a given RTO may include receiving a RTO; receiving a heuristic for determining an amount of unencumbered processing time; determining a type of next backup corresponding to a next backup, wherein the type of next backup is an incremental backup when a sum of recovery times totals less than the received RTO, else the type of the next backup is a full backup; and determining a time to schedule the next backup based on the received RTO being a total of: an amount of time to complete the type of next backup; an amount of time to rollforward zero or more transaction log records; and an amount of time to restore at least one backup.

In another embodiment of the invention, a computer program product for optimizing the number and type of database backups to achieve a given RTO may be provided. The computer program product may include a DBMS embodied on a computer readable storage medium. The DBMS may include code executable by a processor to perform a method that may include receiving an RTO; receiving a heuristic for determining an amount of unencumbered processing time; determining a type of next backup corresponding to a next backup, wherein the type of next backup is an incremental backup when a sum of recovery times totals less than the received RTO, else the type of the next backup is a full backup; and determining a time to schedule the next backup based on the received RTO being a total of: an amount of time to complete the type of next backup; an amount of time to rollforward zero or more transaction log records; and an amount of time to restore at least one backup.

In another embodiment of the invention, a computer system for optimizing the number and type of database backups to achieve a given RTO is provided. The computer system may include one or more processors, one or more computer-readable storage devices, and a plurality of program instructions stored on at least one of the one or more storage devices for execution by at least one of the one or more processors. The plurality of program instructions may include program instructions to receive a RTO; program instructions to receiving a heuristic for determining an amount of unencumbered processing time; program instruction for determining a type of next backup corresponding to a next backup, wherein the type of next backup is an incremental backup when a sum of recovery times totals less than the received RTO, else the type of the next backup is a full backup; and program instructions for determining a time to schedule the next backup based on the received RTO being a total of: an amount time to complete the type of next backup; an amount time to rollforward zero or more transaction log records; and an amount time to restore at least one backup.

BRIEF DESCRIPTION OF THE SEVERAL VIEWS OF THE DRAWING

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
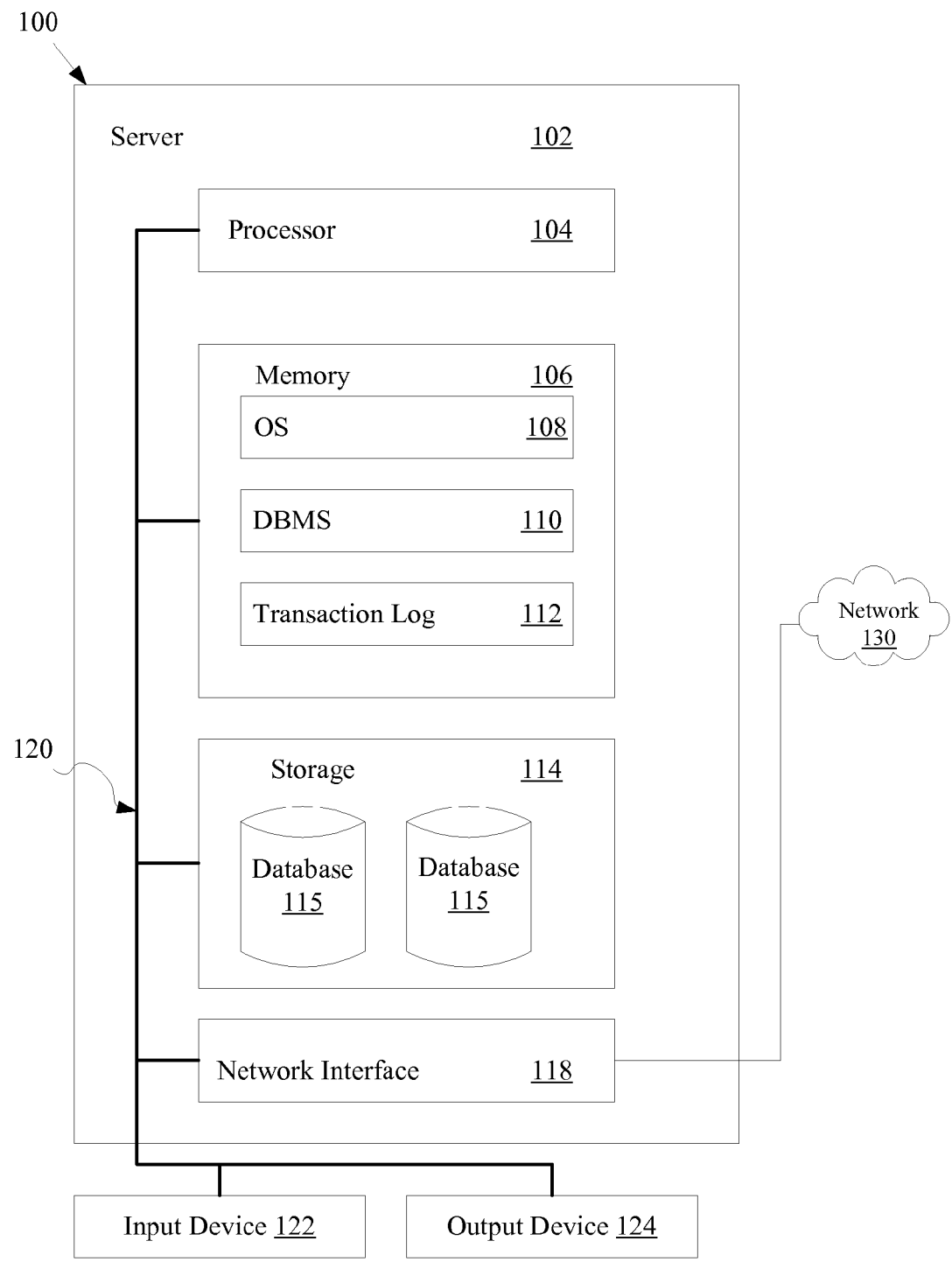
FIG. 1 is a block diagram illustrating an exemplary embodiment of a system for optimizing a number and a type of database backups to achieve a given Recovery Time Objective (RTO)
Figure 2:
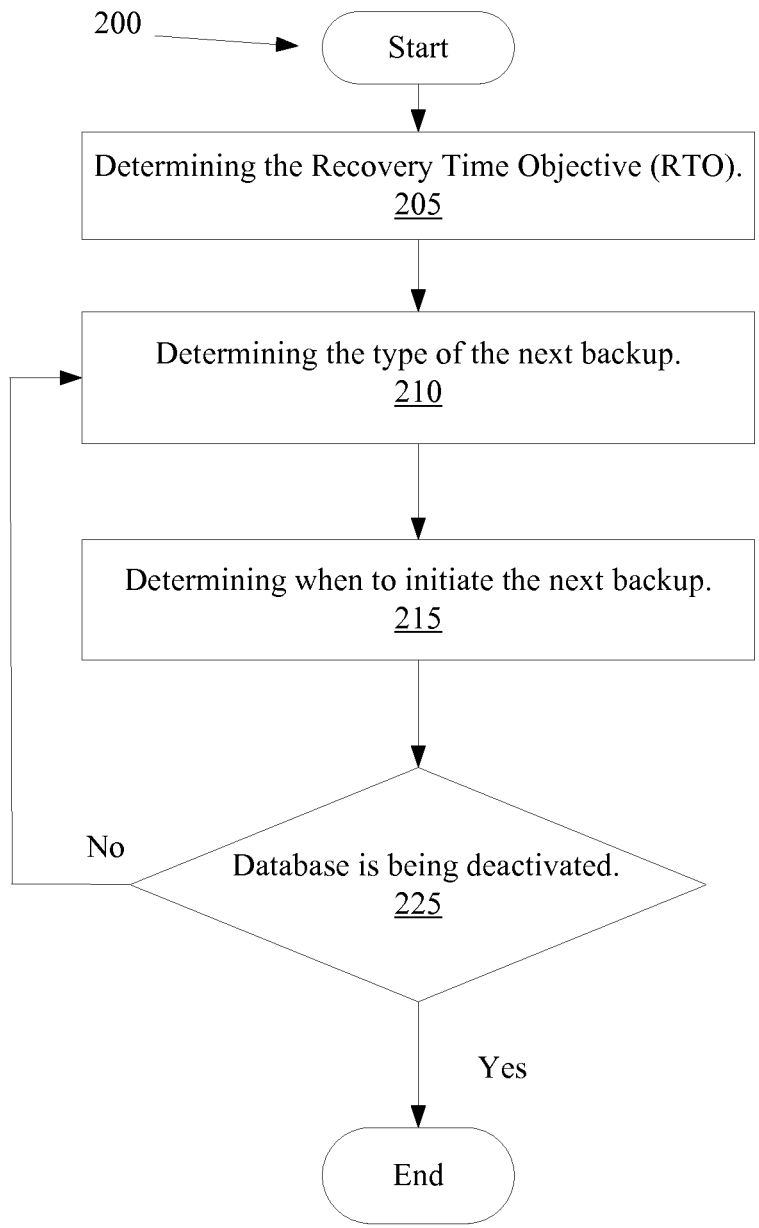
FIG. 2 is a flow diagram illustrating an overview of an exemplary embodiment of a method of optimizing the number and type of database backup to achieve a given RTO.

Embodiments of the present invention will now be described with reference to the figures. Referring to FIGS. 1 and 2, a system 100 and method 200 provide an exemplary implementation for optimizing the number and type of database backups to achieve a given Recovery Time Objective (RTO).

FIG. 1 is a block diagram illustrating an exemplary embodiment of a system 100 for optimizing the number and type of database backups to achieve a given RTO. The networked system 100 includes a server 102. The server 102 may also be connected to other computers and servers via a network 130. In general, the network 130 may be a telecommunications network and/or a wide area network (WAN). In a particular embodiment, the network 130 is the Internet.

The server 102 generally includes a processor 104 connected via a bus 120 to a memory 106, a network interface device 118, a storage 114, an input device 122, and an output device 124. The server 102 is generally under the control of an operating system 108, such as for example Linux. More generally, any operating system supporting the functions disclosed herein may be used. The processor 104 is included to be representative of a single CPU, multiple CPUs, a single CPU having multiple processing cores, and the like. Similarly, the memory 106 may be a random access memory. While the memory 106 is shown as a single identity, it should be understood that the memory 106 may comprise a plurality of modules, and that the memory 106 may exist at multiple levels, from high speed registers and caches to lower speed but larger DRAM chips. The network interface device 118 may be any type of network communications device allowing the server 102 to communicate with other computers via the network 130.

The storage 114 may be a persistent storage device. Although the storage 114 is shown as a single unit, the storage 114 may be a combination of fixed and/or removable storage devices, such as fixed disc drives, solid state drives, floppy disc drives, tape drives, removable memory cards or optical storage. The memory 106 and the storage 114 may be part of one virtual address space spanning multiple primary and secondary storage devices.

The input device 122 may be any device for providing input to the server 102. For example, a keyboard and/or a mouse may be used. The output device 124 may be any device for providing output to a user of the server 102. For example, the output device 116 may be any conventional display screen or set of speakers. Although shown separately from the input device 122, the output device 124 and input device 122 may be combined. For example, a display screen with an integrated touch-screen may be used.

As shown, the memory 106 of the server 102 includes a DBMS 110 configured to manage one or more databases 115, contained in the storage 114 of the server 102. Each database 115 may store data used by one application, or alternatively, several applications may share more than one database. As shown, the memory 106 of server 102 also contains a transaction log 112, which records sufficient information (i.e., transaction log records) for the DBMS to restore the database to a consistent state in case of a service disruption. In an exemplary embodiment, the transaction log records may contain a timestamp, a transaction id, a database page identifier, a checksum value, a value identifying an operation name, pointers to other related transaction log records, and may further contain an image of the data both before and after the modification. Embodiments of the invention may include any mechanism for maintaining timing and sequencing in place of a timestamp.

The particular description in FIG. 1 is for illustrative purposes only; it should be understood that the invention is not limited to specific described embodiments, and any combination is contemplated to implement and practice the invention.

Referring now to FIG. 2, the reference numeral 200 generally designates a flow diagram illustrating an overview of an exemplary method of optimizing the number and type of database backups to achieve a given RTO.

At 205, a user-defined RTO is configured for one or more databases, or globally for the DBMS. The value for the RTO is specified as a unit of time, such as for example four hours, that defines a maximum tolerable amount of time that a database may remain unavailable following a service disruption before the business enterprise is negatively impacted.

At 210, one or more DBMS processes may perform calculations, depicted in FIG. 3 and discussed further below, to determine a type of database backup (e.g., full or incremental) to execute during the next backup cycle. While either type of backup may be taken while the database is online, if the amount of changed data is small compared to the over all size of the database it may be more efficient to execute an incremental backup rather than a full backup.

To meet the RTO, at 215 one or more DBMS processes may perform calculations, depicted in FIG. 4 and discussed further below, to determine when to initiate the next backup.

Generally, at 225 the method depicted in FIG. 2 may iteratively execute as a background administrative task. Therefore, at 225 where the database is online, the one or more DBMS processes execute to determine a type of database backup to execute during the next backup cycle and to perform calculations to determine when to initiate the next backup.

Figure 3:
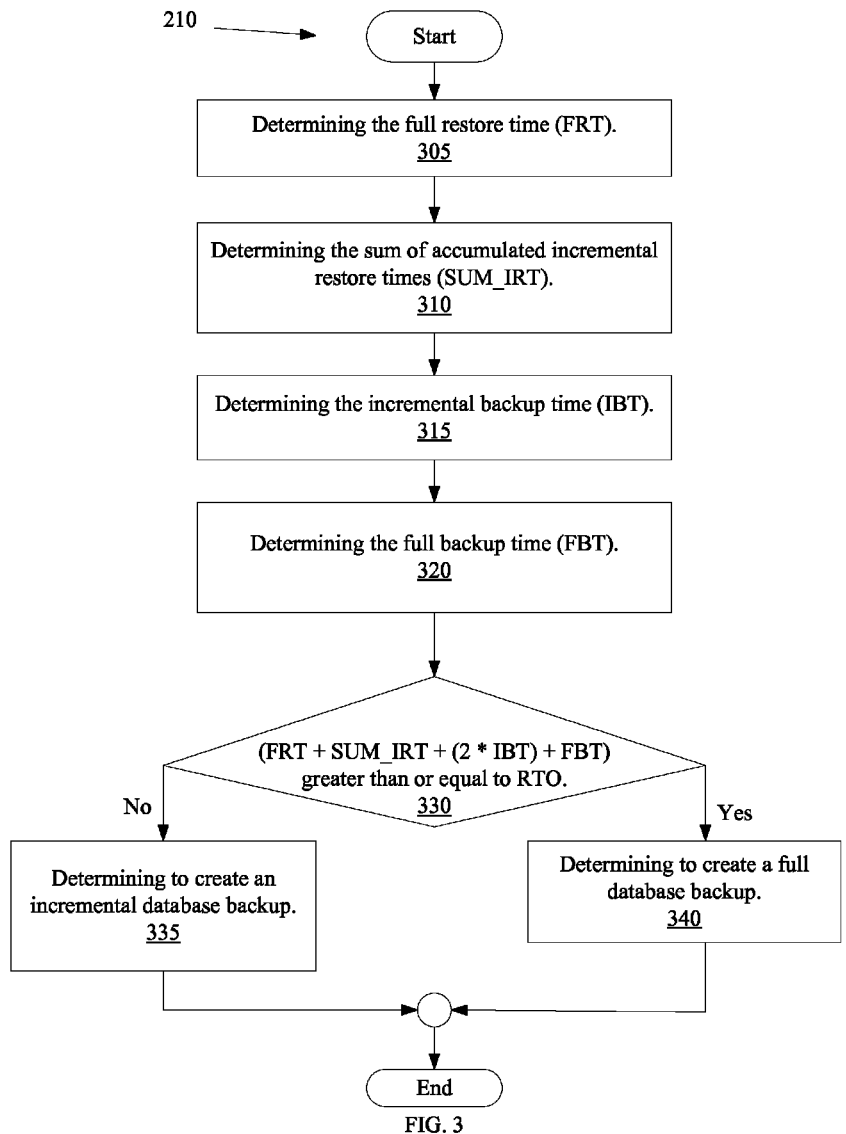
FIG. 3 is a flow diagram illustrating an exemplary embodiment of a method of determining a type of backup to initiate next.

Referring now to FIG. 3, the reference numeral 210 generally designates a flow diagram illustrating an exemplary embodiment of a method of determining a type of backup to initiate next. The following formula, discussed in detail during the discussion of FIG. 3, provides an exemplary calculation for determining the type of backup to initiate next:

$$\left( FRT + \sum_{i=1}^{n} IRTi + 2(IBT) + FBT \right) \qquad \text{(Calculation 1)}$$

Figure 4:
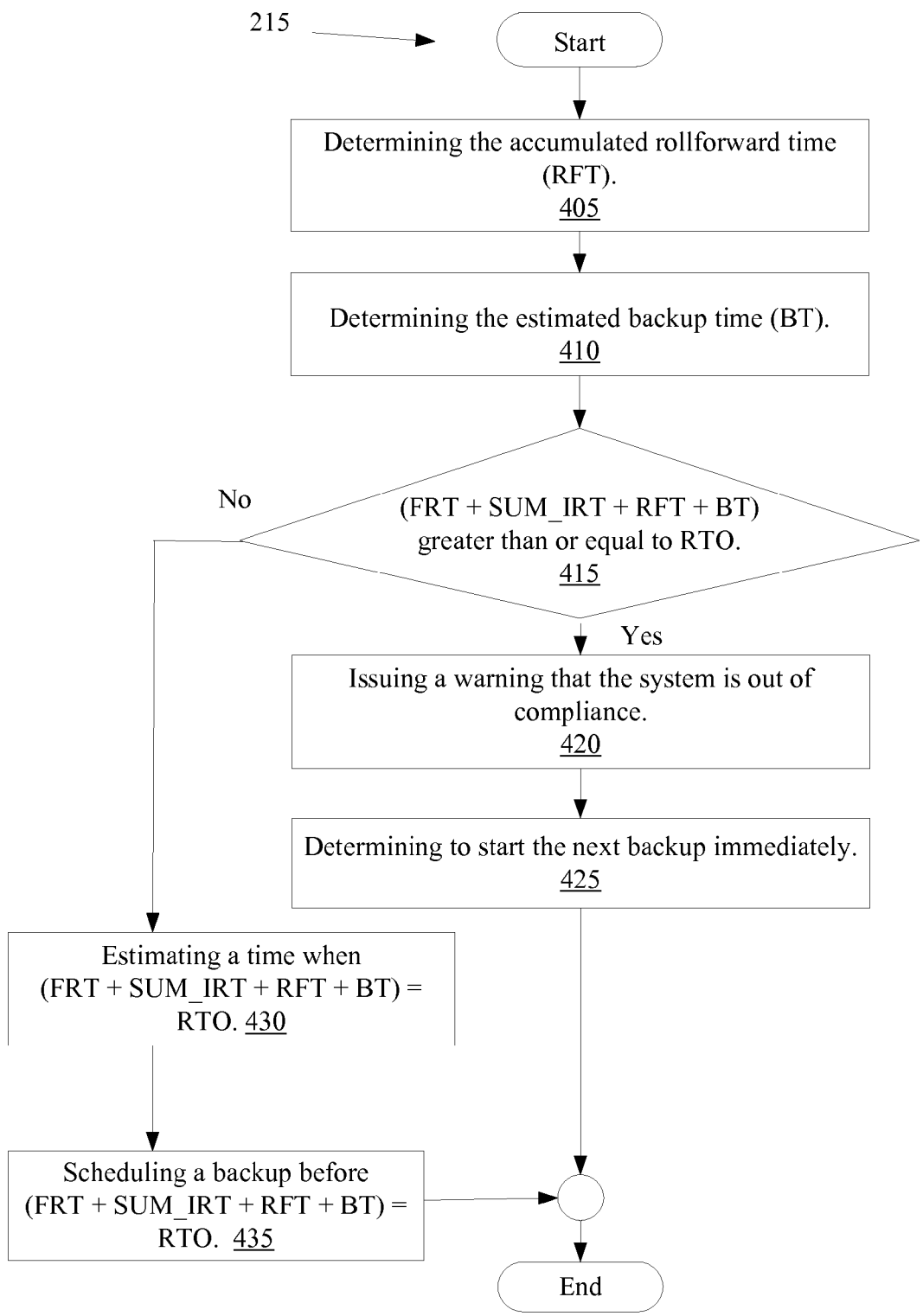
FIG. 4 is a flow diagram illustrating an exemplary embodiment of a method of determining when to initiate the next backup activity.

In general, there are several options from which to choose when creating a database, any of which applies to the exemplary method depicted in FIGS. 2-4. The exemplary embodiment of creating a new database from a restored full backup image applies to the following discussion, although it also applies to creating a new database using a database load utility, for example.

At 305 an amount of time required to restore the most recent full backup, referred to as Full Restore Time (FRT), may be determined in any one of several ways, including for example, consulting a history of restore time information, or by calculating an estimated transfer rate based on the amount of data to be restored.

In the course of normal activities, the DBA may schedule periodic incremental backups to capture changes in the database since the previous backup of any type. At 310 an amount of time required to restore a particular incremental backup, referred to as Incremental Restore Time (IRT), may be determined in any one of several ways, including for example, by observing an elapsed time between the start and completion of the incremental backup process that generated the incremental backup, or by consulting a history of restore time information. Since one or more incremental backups may have been performed since the last full backup, at 310 the estimated time it may take to apply all incremental backups may be represented by SUM_IRT, which is the sum of their individual restore times. The equivalent expression is $$\sum_{i=1}^{n} IRTi,$$

where n represents the number of incremental backups performed since the last full backup. It should be noted that where the last type of backup was a full backup, the value of $$\sum_{i=1}^{n} IRTi$$

will be zero.

At 315 an estimated Incremental Backup Time (IBT) may be determined by estimating the IBT based on previous elapsed incremental backup times.

At 320, a Full Backup Time (FBT) may be estimated using metadata stored by the DBMS and associated with an already completed full backup. Additionally, a FBT may be estimated based on several factors, including among other things, the amount of data (e.g., in gigabytes) contained in the database, the speed and configuration of the target storage devices, speed of the computer processor, amount of computer memory available, and the speed of the network.

At 330, a next backup may be an incremental backup or a full backup, depending upon the relationship between the RTO and the estimated time to restore a full backup and any incremental backups, as determined by the relationships of Calculation "1" (i.e., the recovery time is greater than or equal to the RTO). The sum of: estimated time to restore a full backup; the estimated time to restore any incremental backups including a heuristic, for example an incremental backup time; perform a full backup; and complete a current incremental backup may be referred to collectively as the recovery times.

The choice to perform an incremental or full backup may be influenced by whether the database provides applications sufficient normal transaction processing time, referred to as unencumbered processing time, without competing for resources with an active concurrent backup process. If at 330, the recovery time is greater than or equal to the RTO, then at 335, the DBMS may determine that there is enough time to create another incremental backup and still meet the RTO. The DBMS applies the heuristic, represented by the IBT, where there should be at least a minimum amount of unencumbered processing time between incremental backups. The IBT is doubled in the above formula, indicating that no more than half the time between incremental backups should be used for performing the incremental backup. In another exemplary embodiment, a heuristic other than incremental backup time may be used, including, for example, a fixed time period. In the exemplary embodiment, the heuristic may be a default value, which may be overridden by a user-supplied value.

However, if at 330 the recovery time is less than the RTO, then at 340, the DBMS may estimate the time to complete a full backup, and determine that to keep the database within the RTO a full backup should be created.

Referring now to FIG. 4, the reference numeral 215 generally designates a flow diagram illustrating an exemplary embodiment of a method of determining when to initiate the next backup activity. The following calculation, discussed in detail during the discussion of FIG. 4, provides an exemplary calculation for determining when to initiate the next backup:

$$\left( FRT + \sum_{i=1}^{n} IRTi + RFT + BT \right) \qquad \text{(Calculation 2)}$$

At 405, the terms $$FRT \text{ and } \sum_{i=1}^{n} IRTi$$

(i.e., SUM_IRT) are substantially similar to the terms described above with reference to FIG. 3. The DBMS may determine an accumulated Rollforward Time (RFT), which may represent an amount of time needed to apply transaction log records that were generated since the last incremental backup to the database.

In an exemplary embodiment, the RFT may be continuously calculated using the accumulated recovery cost statistics as recorded in the persistent store, the metadata repository, or in one or more tables within a catalog, either at the database level or at the DBMS level. The following discussion describes an embodiment of recovery cost statistics that may be implemented in a DBMS system, such as DBMS 110 (FIG. 1), and that may be used, for example, by the method 215 (FIG. 4).

A DBMS vendor identifies the recoverable operations that the DBMS may perform, such as an insertion of a row of data or a creation of a table. A recoverable operation may be defined as an operation that changes the state of database objects such as user data, or an operation that changes the state of database control structures such as one or more catalog tables. A recoverable operation may further include one that the DBMS tracks using transaction log records so that the operation may be recovered. As a result, in the event of a DBMS service disruption, the DBMS may use the transaction log records in combination with existing full and incremental backups, as needed, to restore the database to a state prior to the failure.

Having defined the recoverable operations in the DBMS, the DBMS vendor may now associate each recoverable operation with a value representing a recovery cost. A recovery cost value refers to an abstract unit that represents the cost to recover a given recoverable operation in the DBMS. A recovery cost of a given operation may be expressed in units relative to a base unit. Although it may be related to an amount of time it takes to perform the recoverable operation, a recovery cost value is expressed in units that are some multiple of a base operation, as defined by the DBMS vendor. A base operation may be a recoverable operation that requires the least amount of processing resource, e.g., time to complete. For example, during benchmark testing, a DBMS vendor may establish that an insert of a row of data is the least resource-intensive operation, and thus it is defined as the base operation and is assigned a recovery cost of "1" unit. If, for example, further benchmark testing establishes that creating a new table takes "6" microseconds (µs), where the base operation takes "2" µs, then the creation of the new table may be recognized as taking three times longer to complete, and thus be assigned a relative recovery cost of "3" units. In this example, creating a new table may include inserting new entries in several system catalog tables, creating an index for the new table, and inserting the new rows of data, whereas, in contrast, inserting a row of data may only consist of the one operation. Assigning the table creation operation a higher recovery cost relative to the base operation recognizes the higher number of complex operations required to complete the table creation.

The DBMS vendor may provide the recovery cost values for recoverable operations as one or more tables within a catalog, either at the database level or at the DBMS level, as for example in Catalog Sample 1:

Catalog Sample 1

```
SystemCatalog.RecoveryCostOfOperations
{
    OperationName   // Type of operation, such as insert or delete
                    row
    RecoveryCost    // Number of recovery cost units to recover this
                    operation
    OperationCount  // Accumulated count of this operation
}
```

A default cost of each recoverable operation is determined by the DBMS vendor, and is based on the DBMS vendor's knowledge of the internal algorithms and measurements used to implement the recoverable operations.

In another exemplary embodiment, the DBMS vendor may group operations of similar recovery cost values into classes for ease of management, as for example, in Catalog Sample 2:

Catalog Sample 2

```
SystemCatalog.RecoveryClasses
{
    ID              // Class identifier
    ClassName       // E.g., low, medium, high
    CostRange       // E.g., microsecond low to microsecond high values
    OperationCount  // Accumulated count of operations in this class
}
```

As an example, a DBMS may group the recoverable operations into classes, such as "low", "medium", and "high" according to the recovery cost. In operation, recovery objectives such as RTO and Recovery Point Objective (RPO) may frequently be expressed in terms of a scale magnitude, for example, seconds, vs. minutes vs. hours. Therefore, the classes may be based on a scale of magnitude of recovery cost. For example, recoverable operations classified as "high" may be on an order of ten times more costly to recover than those classified as "medium."Similarly, "medium" class recoverable operations may be on an order of ten times more costly to recover than those recoverable operations classified as "low" cost. Using a Structured Query Language (SQL) based interface, an end-user having sufficient authority to perform functions on the system catalogs, for example a DBA, may define, alter, or delete the recovery classes as desired to architect a recovery plan that more closely reflects a particular DBMS environment and business enterprise RTO/RPO goal. Additionally, during a subsequent product upgrade, the DBMS vendor may supply updated recovery cost values to the system catalog tables that may reflect performance enhancements or other additional features in the DBMS.

The DBMS may allocate specialized processes (e.g., threads) to share and parallelize work, such as virtual memory management, data Input/Output, query processing, and monitoring recoverable operations as they occur. Thus the DBMS is implicitly aware of the types of recoverable operations, such as for example an insert of a row of data, that are taking place. The DBMS may include different code paths to execute and manage each of the various recoverable operations. When a particular recoverable operation, for example an insert of a row of data, is executed, then that specific logic, or code path, is invoked. As part of that logic, at 225 the DBMS may also update the persistent storage to increment the count corresponding to the recoverable operation type. In another exemplary embodiment, at 220 the DBMS threads may synchronously parse the transaction log records as they are created. Or, alternatively, the DBMS threads may asynchronously act as background processes to periodically scan the transaction log after the transaction log records are written. The recoverable operations may be tracked for all databases in the DBMS, or alternatively, by some other unit of recovery, such as an application, a DBMS object, or individual table spaces. Having encountered and identified a recoverable operation at 220, the DBMS may then update the persistent store to increment the count corresponding to the recoverable operation encountered.

For example, the recoverable operation of inserting a row of data may occur ten (10) times over a period of time. Thus, the count value for this operation is ten (10). In one exemplary embodiment, the counts may be accumulated and updated either by class, or by individual recoverable operation, depending upon the level of granularity desired and the implementation chosen by the business enterprise. An authorized end-user, such as the DBA, may periodically review the counts of recoverable operations through the SQL interface to the DBMS.

Referring to FIG. 4, at 405 having recovered the database using the most recent backup, the RFT may be derived from the recovery cost statistics (i.e., the count values and the recovery costs) as accumulated since the last backup and recorded in the one or more catalog tables, or other persistent store. The RFT derived here dynamically corresponds to the changes to the database since the last backup. Using the above exemplary catalog definition, for example Catalog Sample 1, RFT may be calculated as the sum of (OperationCount×RecoveryCost) for each OperationName in the Catalog Sample 1.

At 410, BT may refer to either a full backup or an incremental backup, as determined through the method 210 (FIG. 3). Where a full backup is planned, a BT may be estimated based on several factors, including for example, the historical transfer rate to the backup device, the historical full backup times, if available, and the size of the database. Where an incremental backup is planned, the BT may be estimated from previous incremental backup times. If at 415 the calculated estimated time to backup, restore, and recover a database equals or exceeds the RTO, then at 420 the DBMS issues a warning message indicating that the database is out of compliance relative to the RTO, and at 425 the next backup is initiated upon completion of the calculation.

However, if at 415 the calculated backup, restore, and recovery estimate is less than the RTO, then processing continues at 430, where an estimated time is calculated when the time to backup, restore, and recover a database equals the RTO (i.e., Calculation 2). Having calculated a time when the time to backup, restore, and recover a database equals the RTO (i.e., Calculation 2), at 435 the backup is scheduled to start before that time.

Figure 5:
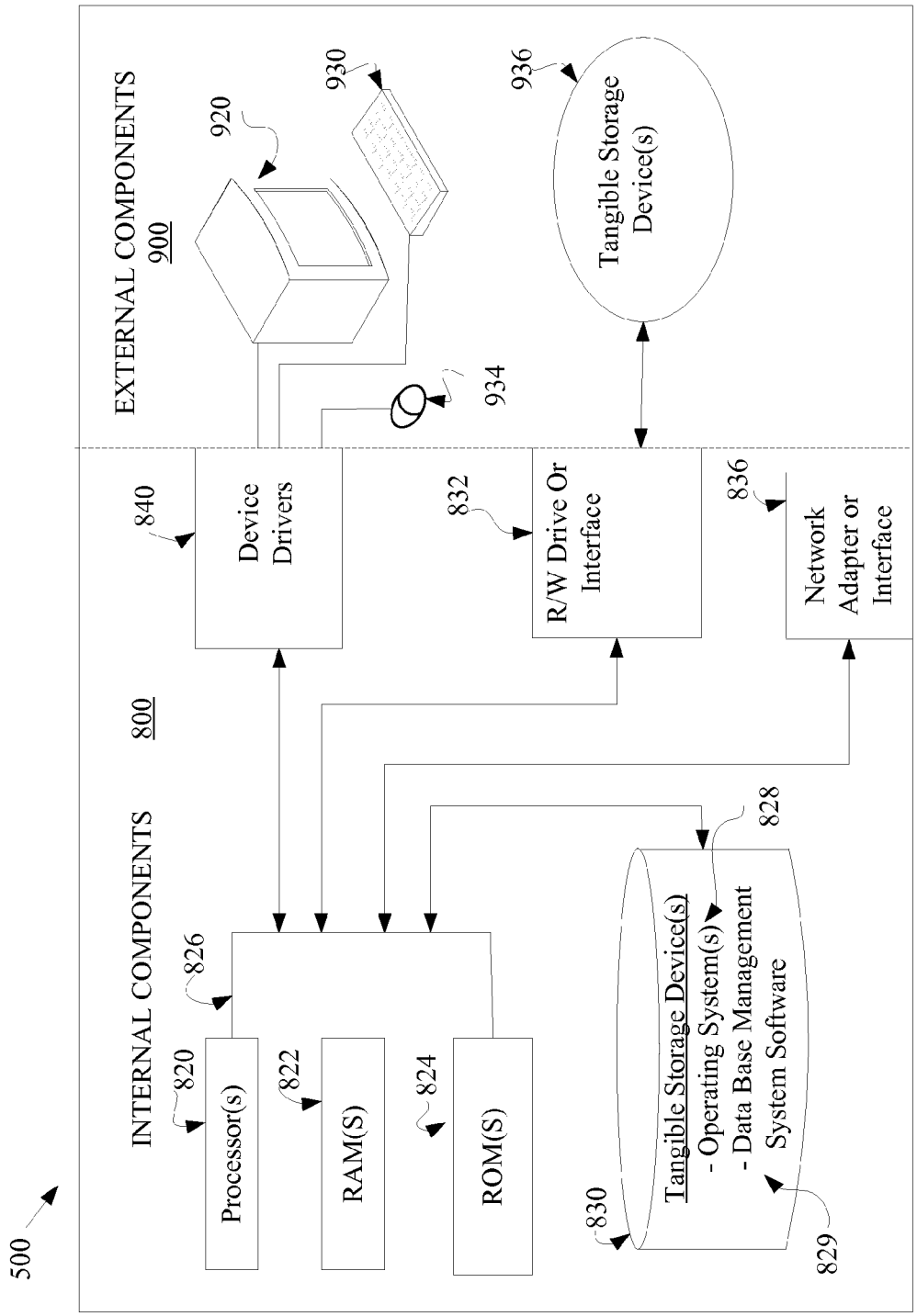
FIG. 5 is a schematic block diagram of hardware and software of the computer environment according to an embodiment of the method of FIG. 2.

Referring now to FIG. 5, computing device 500 may include respective sets of internal components 800 and external components 900. Each of the sets of internal components 800 includes one or more processors 820; one or more computer-readable RAMs 822; one or more computer-readable ROMs 824 on one or more buses 826; one or more operating systems 828; one or more software applications (e.g., DBMS modules 829) executing the method 200; and one or more computer-readable tangible storage devices 830. The one or more operating systems 828 and DBMS modules 829 are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 also includes a R/W drive or interface 832 to read from and write to one or more computer-readable tangible storage devices 936 such as a CD-ROM, DVD, SSD, memory stick, magnetic tape, magnetic disk, optical disk or semiconductor storage device.

Each set of internal components 800 may also include network adapters (or switch port cards) or interfaces 836 such as a TCP/IP adapter cards, wireless WI-FI interface cards, or 3G or 4G wireless interface cards or other wired or wireless communication links. The DBMS 829 and operating system 828 that are associated with computing device 500, can be downloaded to computing device 500 from an external computer (e.g., server) via a network (for example, the Internet, a local area network or other, wide area network) and respective network adapters or interfaces 836. From the network adapters (or switch port adapters) or interfaces 836 and operating system 828 associated with computing device 500 are loaded into the respective hard drive 830 and network adapter 836. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Each of the sets of internal components 800 also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1-5 illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of optimizing the number and type of database backups to achieve a given Recovery Time Objective (RTO) comprising:

receiving a user-defined RTO, wherein the RTO is configured for one or more databases or globally for a database management system (DBMS);

receiving a heuristic for determining an amount of unencumbered processing time;

determining a type of next backup corresponding to a next backup, wherein the type of next backup is an incremental backup when a sum of recovery times totals less than the received RTO, else the type of the next backup is a full backup; and determining a time to schedule the next backup based on the received RTO being a total of:

an amount of time to complete the type of next backup;

an amount of time to rollforward zero or more transaction log records wherein the zero or more transaction log records include one or more recoverable operations and wherein each of the one or more recoverable operations is associated with a recovery cost that is expressed as a multiple of base operation units; and an amount of time to restore at least one backup.

2. The method of claim 1, wherein the sum of the recovery times further comprises a total of:

an amount of time required to restore a latest full backup, an amount of time to restore zero or more incremental backups, an amount of time to complete a current incremental backup, an amount of time corresponding to the heuristic; and an amount of time to complete a full backup.

3. The method of claim 1, wherein determining the type of next backup further comprises:

calculating a total amount of time by aggregating:

an amount of time to restore a full backup;

the amount of time to restore the zero or more incremental backups;

the amount of time to complete the current incremental backup;

the amount of time to complete the full backup; and determining the type of next backup based on the calculated total amount of time and the received RTO.

4. The method of claim 1, wherein determining a time to schedule the next backup further comprises:

when the received RTO is less than the total of:

the amount of time to complete the type of the next backup;

the amount of time to rollforward the zero or more transaction log records; and the amount of time to restore the at least one backup;

issuing a message that the database is out of compliance with the received RTO; and determining to start the next backup immediately.

5. The method of claim 1, wherein calculating an amount of time to rollforward zero or more transaction log records further comprises:

monitoring and tracking recoverable operations as they occur during database execution; they occur;

storing a count and a type of the recoverable operations in a persistent store as extracting from the persistent store the recoverable operations, the count of each of the recoverable operations, and a recovery cost associated with each of the recoverable operations; and for each of the recoverable operations: multiplying the count by the associated recovery cost.

6. The method of claim 2, wherein calculating the amount of time to restore zero or more incremental backups further comprises a sum of times to restore each of the zero or more incremental backups created since the last full backup.

7. The method of claim 1, wherein the amount of time to restore the at least one backup further comprises:
a sum of times to restore each of the zero or more incremental backups created since a last full backup; or
an estimated time to restore a full backup.

8. A computer program product for optimizing the number and type of database backups to achieve a given Recovery Time Objective (RTO), the computer program product including a DBMS embodied on a computer readable storage medium, the DBMS including code executable by a processor to perform a method comprising:
receiving a user-defined RTO, wherein the RTO is configured for one or more databases or globally for a database management system (DBMS);
receiving a heuristic for determining an amount of unencumbered processing time;
determining a type of next backup corresponding to a next backup, wherein the type of next backup is an incremental backup when a sum of recovery times totals less than the received RTO, else the type of the next backup is a full backup; and
determining a time to schedule the next backup based on the received RTO being a total of:
an amount of time to complete the type of next backup;
an amount of time to rollforward zero or more transaction log records,
wherein the zero or more transaction log records include one or more recoverable operations and wherein each of the one or more recoverable operations is associated with a recovery cost that is expressed as a multiple of base operation units; and
an amount of time to restore at least one backup.

9. The computer program product of claim 8, wherein the sum of recovery times further comprises a total of:
an amount of time required to restore a latest full backup,
an amount of time to restore zero or more incremental backups,
an amount time to complete a current incremental backup,
an amount of time corresponding to the heuristic; and
an amount of time to complete a full backup.

10. The computer program product of claim 8, wherein determining the type of next backup further comprises:
calculating a total amount of time by aggregating:
an amount of time to restore a full backup;
the amount of time to restore zero or more incremental backups;
the amount of time to complete an incremental backup;
the amount of time to complete a full backup; and
determining the type of next backup based on the calculated total amount of time and the received RTO.

11. The computer program product of claim 8, wherein determining a time to schedule the next backup further comprises:
when the received RTO is less than the total of:
the amount of time to complete the type of the next backup;
the amount of time to rollforward the zero or more transaction log records; and
the amount of time to restore the at least one backup;
issuing a message that the database is out of compliance with the received RTO; and
determining to start the next backup immediately.

12. The computer program product of claim 8, wherein calculating the amount of time to rollforward zero or more transaction log records further comprises:
monitoring and tracking recoverable operations as they occur during database execution;
storing a count and a type of the recoverable operations in a persistent store as they occur;
extracting from the persistent store the recoverable operations, the count of each of the recoverable operations, and a recovery cost associated with each of the recoverable operations; and
for each of the recoverable operations: multiplying the count by the associated recovery cost.

13. The computer program product of claim 9, wherein calculating the amount of time to restore zero or more incremental backups further comprises a sum of times to restore each of the zero or more incremental backups created since the last full backup.

14. A computer system for optimizing the number and type of database backups to achieve a given Recovery Time Objective (RTO), the computer system comprising one or more processors, one or more computer-readable storage devices, and a plurality of program instructions stored on at least one of the one or more storage devices for execution by at least one of the one or more processors, the plurality of program instructions comprising:
receiving a user-defined RTO, wherein the RTO is configured for one or more databases or globally for a database management system (DBMS);
receiving a heuristic for determining an amount of unencumbered processing time;
determining a type of next backup corresponding to a next backup, wherein the type of next backup is an incremental backup when a sum of recovery times totals less than the received RTO, else the type of the next backup is a full backup; and
determining a time to schedule the next backup based on the received RTO being a total of:
an amount of time to complete the type of next backup;
an amount of time to rollforward zero or more transaction log records,
wherein the zero or more transaction log records include one or more recoverable operations and
wherein each of the one or more recoverable operations is associated with a recovery cost that is expressed as a multiple of base operation units; and
an amount of time to restore at least one backup.

15. The computer system of claim 14, wherein the sum of recovery times further comprises a total of:
an amount of time required to restore a latest full backup,
an amount of time to restore zero or more incremental backups, an amount of time to complete a current incremental backup,
an amount of time corresponding to the heuristic; and
an amount time to perform a full backup.

16. The computer system of claim 14, wherein determining the type of next backup
further comprises:
calculating a total amount of time by aggregating: an amount of time to restore a full backup;
the amount of time to restore the zero or more incremental backups; the amount of time to complete the current incremental backup;
the amount of time to complete the full backup; and
determining the type of next backup based on the calculated total amount of time and the received RTO.

17. The computer system of claim 14, wherein determining a time to schedule the next backup further comprises:
when the received RTO is less than the total of:
the amount of time to complete the type of the next backup;
the amount of time to rollforward the zero or more transaction log records; and
the amount of time to restore the at least one backup;
issuing a message that the database is out of compliance with the received RTO; and
determining to start the next backup immediately.

18. The computer system of claim 14, wherein calculating the amount of time to rollforward zero or more transaction log records further comprises:
monitoring and tracking recoverable operations as they occur during database execution;
storing a count and a type of the recoverable operations in a persistent store as they occur;
extracting from the persistent store the recoverable operations, the count of each of the recoverable operations, and a recovery cost associated with each of the recoverable operations; and
for each of the recoverable operations: multiplying the count by the associated recovery cost.

19. The computer system of claim 14, wherein the amount of time to restore the at least one backup further comprises:
a sum of times to restore each of the zero or more incremental backups created since a last full backup; or
an estimated time to restore a full backup.

20. The computer system of claim 15, wherein calculating the amount of time to restore the zero or more incremental backups further comprises a sum of times to restore each of the zero or more incremental backups created since the last full backup.

* * * * *